(12) United States Patent
Lu et al.

(10) Patent No.: US 11,598,880 B2
(45) Date of Patent: Mar. 7, 2023

(54) DETECTING FAULT STATES OF AN AIRCRAFT

(71) Applicant: The Boeing Company, Chicago, IL (US)

(72) Inventors: Tsai-Ching Lu, Thousand Oaks, CA (US); Charles E. Martin, Thousand Oaks, CA (US); Stephen C. Slaughter, Scottsdale, AZ (US); Richard Patrick, Irvine, CA (US)

(73) Assignee: The Boeing Company, Chicago, IL (US)

( * ) Notice: Subject to any disclaimer, the term of this patent is extended or adjusted under 35 U.S.C. 154(b) by 696 days.

(21) Appl. No.: 16/151,499

(22) Filed: Oct. 4, 2018

(65) Prior Publication Data

US 2020/0110181 A1 Apr. 9, 2020

(51) Int. Cl.
*G01S 19/20* (2010.01)
*G05B 23/02* (2006.01)
*B64D 45/00* (2006.01)

(52) U.S. Cl.
CPC .......... *G01S 19/20* (2013.01); *G05B 23/0221* (2013.01); *G05B 23/0224* (2013.01); *G05B 23/0243* (2013.01); *B64D 2045/0085* (2013.01)

(58) Field of Classification Search
CPC . G01S 19/20; G05B 23/0243; G05B 23/0221; G05B 23/0224; B64D 2045/0085
See application file for complete search history.

(56) References Cited

U.S. PATENT DOCUMENTS

| | | | | |
|---|---|---|---|---|
| 8,165,826 | B2* | 4/2012 | Schimert | G05B 19/4065 |
| | | | | 702/184 |
| 9,983,009 | B2* | 5/2018 | Roger | G08G 5/003 |
| 2018/0297573 | A1* | 10/2018 | Alam | B60T 8/1703 |
| 2019/0086291 | A1* | 3/2019 | Frewen | G06Q 10/20 |
| 2019/0368133 | A1* | 12/2019 | Joshi | B64C 39/024 |
| 2020/0027442 | A1* | 1/2020 | Mathur | G10L 15/063 |

OTHER PUBLICATIONS

Bengio, Y., et al., "Deep Generative Stochastic Networks Trainable by Backprop", Proceedings of the 31st International Conference on Machine Learning, Beijing, China, 2014, 9 pages.

(Continued)

*Primary Examiner* — Thomas Ingram
(74) *Attorney, Agent, or Firm* — Womble Bond Dickinson (US) LLP (57) ABSTRACT

An apparatus for detecting a fault state of an aircraft is provided. The apparatus accesses a training set of flight data for the aircraft. The training set includes observations of the flight data, each observation of the flight data includes measurements of properties selected and transformed into a set of features. The apparatus builds a generative adversarial network including a generative model and a discriminative model using the training set and the set of features, and builds an anomaly detection model to predict the fault state of the aircraft. The anomaly detection model is trained using the training set of flight data, simulated flight data generated by the generative model, and a subset of features from the set of features. The apparatus deploys the anomaly detection model to predict the fault state of the aircraft using additional observations of the flight data.

20 Claims, 4 Drawing Sheets

(56) References Cited

OTHER PUBLICATIONS

Goodfellow, I., et al., "Generative Adversarial Nets", Departement d'informatique et de recherce operationnelle, Universite de Montreal, Montreal, Quebec, Canada, <http://arxiv.org/abs/1406.2661>, Jun. 10, 2014, pp. 1-9.
Kingma, D., "Fast Gradient-Based Inference with Continuous Latent Variable Models in Auxiliary Form", Intelligent Autonomous Systems Group, Universiteit van Amsterdam, <http://arxiv.org/abs/1306.0733>, Jun. 4, 2013, pp. 1-9.
Liu, Fei Tony & Zhou, Zhi-Hua , "Isolation Forest", Proceedings from the 8th IEEE International Conference on Data Mining, 2008, pp. 413-422.
Rezende, D., et al., "Stochastic Backpropagation and Approximate Inference in Deep Generative Models", Proceedings of the 31st International Conference on Machine Learning, Beijing, China, May 30, 2014, 14 pages.
Rousseeuw, P. & Van Driessen, K., "A Fast Algorithm for the Minimum Covariance Determinant Estimator", Technometrics 41(3), Antwerp, Belgium, Dec. 15, 1998, 31 pages.
Scholkopf, B., et al., "Estimating the Support of a High-Dimensional Distribution", Neural Computation, Massachusetts Institute of Technology, 2001, pp. 1443-1471.
White, T., "Sampling Generative Networks", 30th Conference on Neural Information Processing Systems (NIPS 2016), Barcelona, Spain, <http://arxiv.org/abs/1609.04469>, Dec. 6, 2016, 11 pages.

* cited by examiner

DETECTING FAULT STATES OF AN AIRCRAFT

TECHNOLOGICAL FIELD

The present disclosure relates generally to detecting one or more fault states of an aircraft, and in particular, to detecting one or more fault states of an aircraft based on a generative adversarial network (GAN).

BACKGROUND

Detecting fault states of an aircraft is important for operation and maintenance of the aircraft. Some existing solutions create models that act as anomaly detectors to detect fault states of an aircraft. These solutions are generally applied directly to raw data or low-level hand-designed features such as condition indicators. These solutions are more susceptible to false alarms and false negatives due to noise and normal variability in the underlying data distribution.

Another solution is to produce predictions of fault states based on real flight data of the aircraft measured by sensors or avionic systems on the aircraft. However, an aircraft can generate terabytes of flight data over the course of a year and this amount may rapidly increase with the increase of sensors. Thus, the large amount of real flight data may increase the data storage requirement of the system performing the detection of fault states. Some existing approaches to handle the large amount of real flight data include using techniques such as low sampling rates, intermittent sampling, down sampling before transmission or storage, data thresholding, and simply deleting flight data that has been stored for a predefined period of time. These approaches are undesirable because they may discard flight data with useful information.

Therefore, it would be desirable to have a system and method that takes into account at least some of the issues discussed above, as well as other possible issues.

BRIEF SUMMARY

Example implementations of the present disclosure are directed to detecting one or more fault states of an aircraft based on a generative adversarial network (G(AN). Example implementations provide a data-driven method and system for improving aircraft prognostics. Example implementations can enhance aircraft prognostics using machine learning (ML) to simultaneously learn a generative model that can generate simulated flight data, and a discriminative model that can detect anomalous flight data. The generative model and discriminative model can be built and trained using a GAN. Example implementations can implement the generative model and discriminative model as separate neural networks that compete with one another in a two-player game.

In example implementations, the generative model can attempt to produce a simulated or fake data distribution of flight data of the aircraft that is as close as possible to the real measured data distribution. Simultaneously, the discriminative model can attempt to distinguish between the simulated or fake data and data drawn from the real measured data distribution. The generative model and discriminative model can converge to an equilibrium, where the simulated data distribution produced by the generative model may closely match the real data distribution and the discriminative model may have learned features that capture the statistical properties of the real data distribution. The learned features can be used to train an anomaly detection model such as a one-class support vector machine, for the purpose of detecting fault states of the aircraft and generating early warning signals of component failures.

Example implementations can reduce data storage requirements of the system performing the detection of fault states. The system may store only a small amount of measured real flight data. When large amounts of flight data are required, for example when training an anomaly detection model, the stored small amount of real flight data can be supplemented with a large amount of simulated flight data generated by the generative model. The system may not need to store the large amount of simulated flight data. Instead, the system may store the generative model and/or discriminative model. Because the simulated data distribution produced by the generative model may closely match the real data distribution, and the discriminative model may have learned features that capture the statistical properties of the real data distribution, the training of the anomaly detection model can be performed using the small amount of real flight data supplemented with the large amount of simulated flight data and the learned features. The trained anomaly detection model can provide an accurate and robust detection of fault states of the aircraft by detecting impending component failures that alter the measured data distribution.

Example implementations do not need to make a priori assumption, that is, an assumption that is true without further proof or need to prove it, about the measured data distribution and can handle high-dimensional data distributions. Example implementations also do not require that the flight data be labeled as normal or abnormal. That is, example implementations can provide an unsupervised machine learning solution.

The present disclosure thus includes, without limitation, the following example implementations.

Some example implementations provide a method of detecting a fault state of an aircraft, comprising: accessing a training set of flight data for the aircraft, the training set including observations of the flight data, each observation of the flight data includes measurements of properties from sensors or avionic systems selected and transformed into a set of features; building a generative adversarial network (GAN) including a generative model and a discriminative model using the training set and the set of features, the generative model and the discriminative model being trained to respectively generate simulated flight data corresponding to the flight data, and evaluate the simulated flight data, until the simulated flight data has a corresponding distribution that matches a distribution of the flight data, the discriminative model further identifying a subset of features from the set of features that capture statistical properties of the distribution of the flight data; building an anomaly detection model to predict the fault state of the aircraft, the anomaly detection model being trained using the training set of flight data, the simulated flight data, and the subset of features; and deploying the anomaly detection model to predict the fault state of the aircraft using additional observations of the flight data.

In some example implementations of the method of any preceding example implementation, or any combination of preceding example implementations, the properties from the sensors or avionic systems are selected properties from a plurality of properties from a plurality of sensors or avionic systems, and accessing the training set includes at least: accessing a flight dataset for the aircraft, the flight dataset including the observations of the flight data, each observation of the flight data includes measurements of the plurality of properties from the plurality of sensors or avionic systems; and filtering the observations of the flight data by the selected properties to produce the training set including the observations of the flight data, each observation of flight data includes the measurements of the selected properties.

In some example implementations of the method of any preceding example implementation, or any combination of preceding example implementations, each observation is measured during operation of the aircraft in the fault state.

In some example implementations of the method of any preceding example implementation, or any combination of preceding example implementations, the discriminative model includes the anomaly detection model, and building the anomaly detection model includes training the discriminative model to predict the fault state of the aircraft.

In some example implementations of the method of any preceding example implementation, or any combination of preceding example implementations, the generative model and the discriminative model are trained using Wasserstein distance to measure a difference between the distribution of the flight data and the corresponding distribution of the simulated flight data until the generative model and the discriminative model are in Nash equilibrium.

In some example implementations of the method of any preceding example implementation, or any combination of preceding example implementations, the method further comprises establishing a digital datalink with the aircraft; receiving the additional observations of the flight data from the aircraft over the digital datalink; predicting and thereby produce a prediction of the fault state of the aircraft using the anomaly detection model as deployed, and using the additional observations of the flight data received from the aircraft over the digital datalink; and generating an alert in response to the prediction.

In some example implementations of the method of any preceding example implementation, or any combination of preceding example implementations, the observations of the flight data in the training set of flight data are from a larger plurality of observations of the flight data, and the anomaly detection model is trained using the simulated flight data generated by the generative model, without using the larger plurality of observations of the flight data that are not retained in data storage of an apparatus implementing the method to reduce a storage requirement of the apparatus.

Some example implementations provide an apparatus for detecting a fault state of an aircraft. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for detecting a fault state of an aircraft. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to detecting one or more fault states of an aircraft, and in particular, to detecting one or more fault states of an aircraft based on a generative adversarial network (GAN). The system is primarily described in the context of an aircraft, but it should be understood that the system is equally applicable to any of a number of types of vehicles such as any of a number of different types of manned or unmanned land vehicles, aircraft, spacecraft, watercraft or the like.

Figure 1:
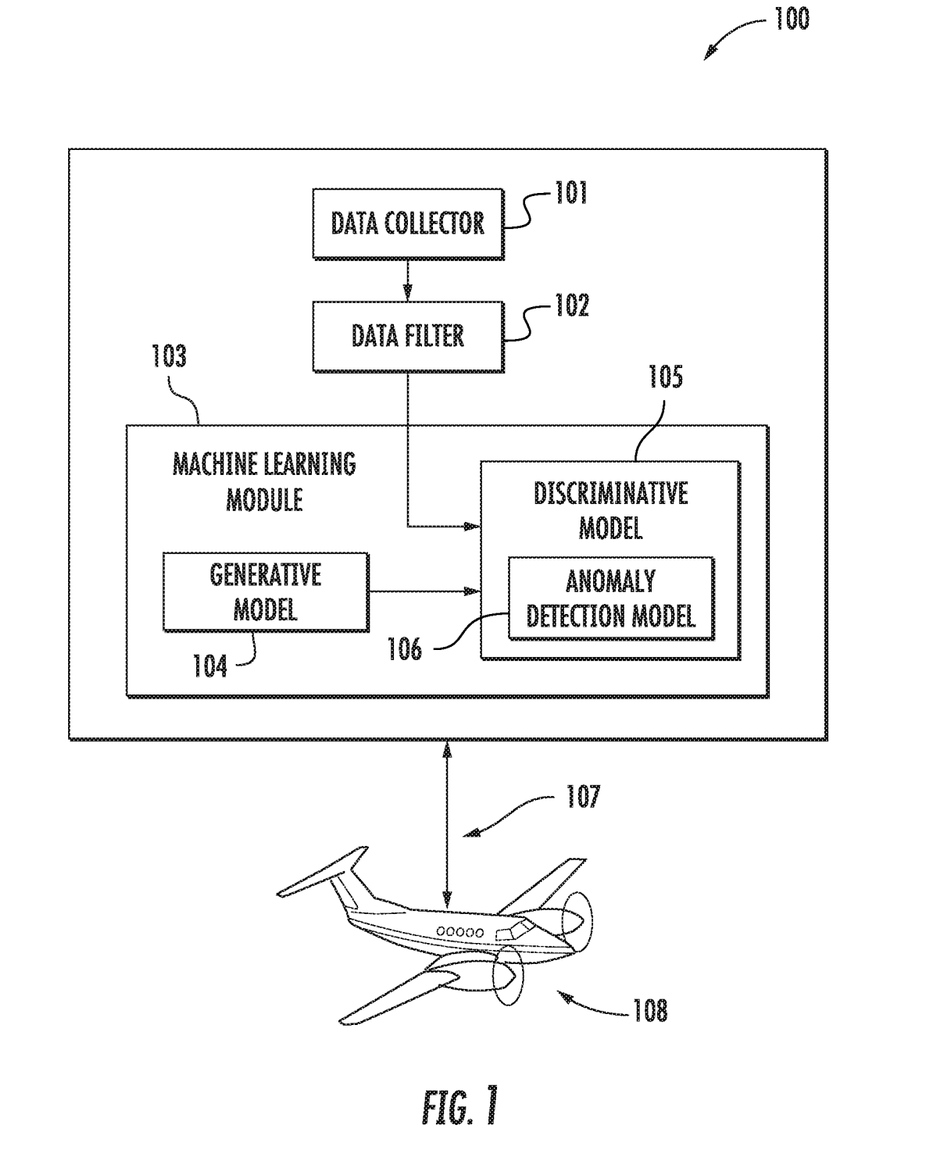
FIG. 1 illustrates a system for detecting a fault state of an aircraft, according to example implementations of the present disclosure.

FIG. 1 illustrates a system 100 for detecting a fault state of an aircraft 108, according to example implementations of the present disclosure. In some examples, as described in greater detail with reference to FIG. 4, the system may be implemented by an apparatus for detecting a fault state of an aircraft.

The system 100 includes any of a number of different subsystems (each an individual system) for performing one or more functions or operations. As shown, in some examples, the system includes one or more of each of a data collector 101, a data filter 102 and a machine learning module 103. The subsystems may be co-located or directly coupled to one another, or in some examples, various ones of the subsystems may communicate with one another across one or more computer networks. Further, although shown as part of the system, it should be understood that any one or more of the data collector, data filter and machine learning module may function or operate as a separate system without regard to any of the other subsystems. It should also be understood that the system may include one or more additional or alternative subsystems than those shown in FIG. 1.

In some examples, the data collector 101 is configured to access a training set of flight data for the aircraft 108. The training set may be stored in a database and the data collector may extract the training set from the database. The training set includes observations of the flight data. Each observation of the flight data includes measurements of properties from sensors or avionic systems (of the aircraft) selected and transformed into a set of features. For example, the training set may include measurements of acceleration, cabin air pressure, gas temperature, and/or other properties of the aircraft during one or more training flight legs. The measurements may be selected and transformed into a set of features to indicate operating conditions of the aircraft. For example, the measurements of cabin air pressure may indicate the altitude of the aircraft. The features may be statistics of the sensor measurements. For example, the shock pulse energy can be a feature used to detect bearing wear in rotary machinery, such as a gearbox. Other examples include statistics based on time-synchronous averaging of signals (e.g., from an accelerometer) and energy in different bandwidths of the frequency spectrum. These features may be used to detect chipped gear-teeth or bent or misaligned shafts.

In some examples, the properties from the sensors or avionic systems of the aircraft 108 are selected properties from a plurality of properties from a plurality of sensors or avionic systems of the aircraft. For example, a plurality of sensors or avionic systems may measure a plurality of properties including acceleration, cabin air pressure, gas temperature, and/or other properties of the aircraft during multiple training flight legs. The selected properties or properties of interest may include cabin air pressure during a number of recent training flight legs such as the most recent five training flight legs.

In some examples, the data collector 101 is configured to access a flight dataset for the aircraft 108. The flight dataset includes the observations of the flight data. Each observation of the flight data includes measurements of the plurality of properties from the plurality of sensors or avionic systems. The data collector can transmit the flight dataset to a data filter 102. The data filter is configured to filter the observations of the flight data by the selected properties to produce the training set. After filtering the observations of the flight data, the training set includes the filtered observations of the flight data. Each observation of flight data in the training set includes the measurements of the selected properties. For example, the data collector can be configured to access a flight dataset including measurements of acceleration, cabin air pressure, gas temperature, and/or other properties of the aircraft during multiple training flight legs. After the filtering, the training set may include measurements of cabin air pressure during the most recent five training flight legs.

The data filter 102 can also filter the observations of the flight data accessed by the data collector 101 based on a data distribution of interest. In one example, the data distribution of interest may be flight data generated under normal, as-designed operating conditions (i.e., operation of the aircraft not in a fault state). The data filter may remove flight data not generated under as-designed operating conditions. In this example, the data collector is configured to access the training set including the observations of the flight data. Each observation of the flight data includes the measurements of properties from the sensors or avionic systems during as-designed operation of the aircraft 108.

In another example, the data distribution of interest is flight data generated when a particular failure mode or a fault state is present. The data filter 102 may remove all flight data not collected or measured under the fault state. In this example, the data collector 101 is configured to access the training set including the observations of the flight data. Each observation of the flight data includes the measurements of properties from the sensors or avionic systems during operation of the aircraft in the fault state. That is, each observation is measured during operation of the aircraft in the fault state.

The data filter 102 can use filtering techniques such as the elliptic envelope method that can make assumptions of the data distribution of interest and is robust to noise to filter the observations of the flight data. In one example, after the filtering, the majority of the training set includes flight data generated according to the distribution of interest. The training set may also include flight data not generated according to the distribution of interest.

The data filter 102 can provide the training set including the filtered observations of the flight data to the machine learning module 103. In some examples, the machine learning module is configured to build a GAN using the training set and the set of features derived from the observations of the flight data in the training set. The GAN includes a generative model 104 and a discriminative model 105. The generative model is trained to generate simulated flight data that mimics the real flight data in the training set. The discriminative model is trained to evaluate the simulated flight data. The generative model and discriminative model are trained until the simulated flight data has a corresponding distribution that matches a distribution of the real flight data in the training set. Training of the generative model and discriminative model will be described in detail below with reference to FIG. 2.

In some examples, the discriminative model 105 is further configured to identify a subset of features from the set of features that capture statistical properties of the distribution of the flight data in the training set. For example, the set of features may indicate the altitude of the aircraft and the data distribution of interest may be flight data generated during as-designed operation of the aircraft. In this example, based on the measured cabin air pressure during as-designed operation of the aircraft, the discriminative model can identify the altitude of the aircraft during as-designed operation of the aircraft.

In some examples, the generative model 104 and the discriminative model 105 are trained using Wasserstein distance or metric, which is a mathematic distance function defined between probability distributions on a given metric space, to measure a difference between the distribution of the flight data in the training set and the corresponding distribution of the simulated flight data, until the generative model and the discriminative model are in a game theory solution concept called Nash equilibrium. Using Wasserstein distance to train the generative model and the discriminative model can improve the speed of convergence to Nash equilibrium and the robustness of the GAN. Wasserstein distance is a metric between probability distributions. During training, the GAN can estimate the Wasserstein distance between the real flight data and the simulated flight data. The GAN can provide a robust measurement of the Wasserstein distance between the real flight data and the simulated flight data. During training, the Wasserstein distance between the real flight data and the simulated flight data may decrease. When the Wasserstein distance between the real flight data and the simulated flight data converges, i.e., the Wasserstein distance stops decreasing, the training can be finished. At this point, the machine learning module can determine that the simulated flight data has a corresponding distribution that matches a distribution of the real flight data in the training set.

After the generative model 104 and discriminative model 105 are trained, the machine learning module 103 is configured to build an anomaly detection model 106, also referred to herein as an anomaly detector, to predict the fault state of the aircraft, the anomaly detection model being built to predict the fault state according to any of a number of anomaly detection techniques. The anomaly detection model is trained using the training set of flight data, the simulated flight data, and the subset of features. In some examples, the discriminative model includes the anomaly detection model. In these examples, the discriminative model can be used as the anomaly detection model, and the machine learning module is configured to train the discriminative model to predict the fault state of the aircraft. In other examples, the anomaly detection model may be a separate model from the discriminative model.

As explained above, in some examples, using simulated flight data generated by the generative model 104 can reduce data storage requirements of the system 100. The system may store only a small amount of real flight data. When large amounts of flight data are required, for example when training the anomaly detection model 106, the stored small amount of real flight data can be supplemented with a large amount of simulated flight data generated by the generative model. The system may not need to store the large amount of simulated flight data. Instead, the system may store the generative model and/or discriminative model. In these examples, the observations of the flight data in the training set of flight data includes are from a larger plurality of observations of the flight data. The anomaly detection model is trained using the simulated flight data generated by the generative model, without using the larger plurality of observations of the flight data that are retained in data storage of the system to reduce a storage requirement of the system.

After the anomaly detection model 106 is trained, in some examples, the machine learning module 103 is configured to deploy the anomaly detection model to predict the fault state of the aircraft using additional observations of the flight data. In some examples, the data collector 101 is configured to establish a digital datalink 107 with the aircraft 108 and receive additional observations of the flight data from the aircraft over the digital datalink. The aircraft may be in flight and the additional observations of the flight data may include measurements of real time flight data from the aircraft. In these examples, the machine learning module is configured to predict and thereby produce a prediction of the fault state of the aircraft using the anomaly detection model as deployed, and using the additional observations of the flight data received from the aircraft over the digital datalink. In response to the prediction of the fault state, the machine learning module is configured to generate an alert. In response to the alert, the pilot of the aircraft and/or the control center on the ground may control the operation of the aircraft, e.g., landing of the aircraft, to avoid the occurrence of the fault state. In another example, in response to the alert indicating the fault state, the aircraft can be indexed to a maintenance facility for performing maintenance and/or repair. In this example, engineers or technicians at the maintenance facility can repair, update or replace the one or more parts related to or causing the fault state.

As explained above, a GAN can be built and trained for detecting fault states of an aircraft. Before the GAN is built and trained, the machine learning module 103 may perform a standardizing or normalizing process to the filtered data output from the data filter 102. For example, the machine learning module may perform a z-score standardization (e.g., mean=0, variance=1) to the filtered data. The standardized data can be used to train the generative model 104 and discriminative model 105 in the GAN, which can be implemented as separate neural networks that compete with one another in a two-player game.

In the training process, the generative model 104 may attempt to learn how to generate simulated flight data that is as close as possible to real flight data from the distribution of interest. Simultaneously, the discriminative model 105 may attempt to distinguish between the simulated flight data and the real flight data. The generative model may attempt to generate simulated flight data that the discriminative model classifies as real flight data, i.e., the discriminative model is "fooled" by the generative model. In the training process, the generative model and discriminative model can converge to an equilibrium such as Nash equilibrium. At the equilibrium, the generative model can generate simulated flight data having a corresponding distribution that matches a distribution of the real flight data. That is, the generative model can generate simulated flight data that mimics the real flight data closely. At the equilibrium, the discriminative model may not be able to distinguish between the simulated flight data and the real flight data because the simulated flight data is similar to the real flight data. However, at the equilibrium, the discriminative model may have learned salient features of the real flight data and can tell what the real flight data looks like.

Figure 2:
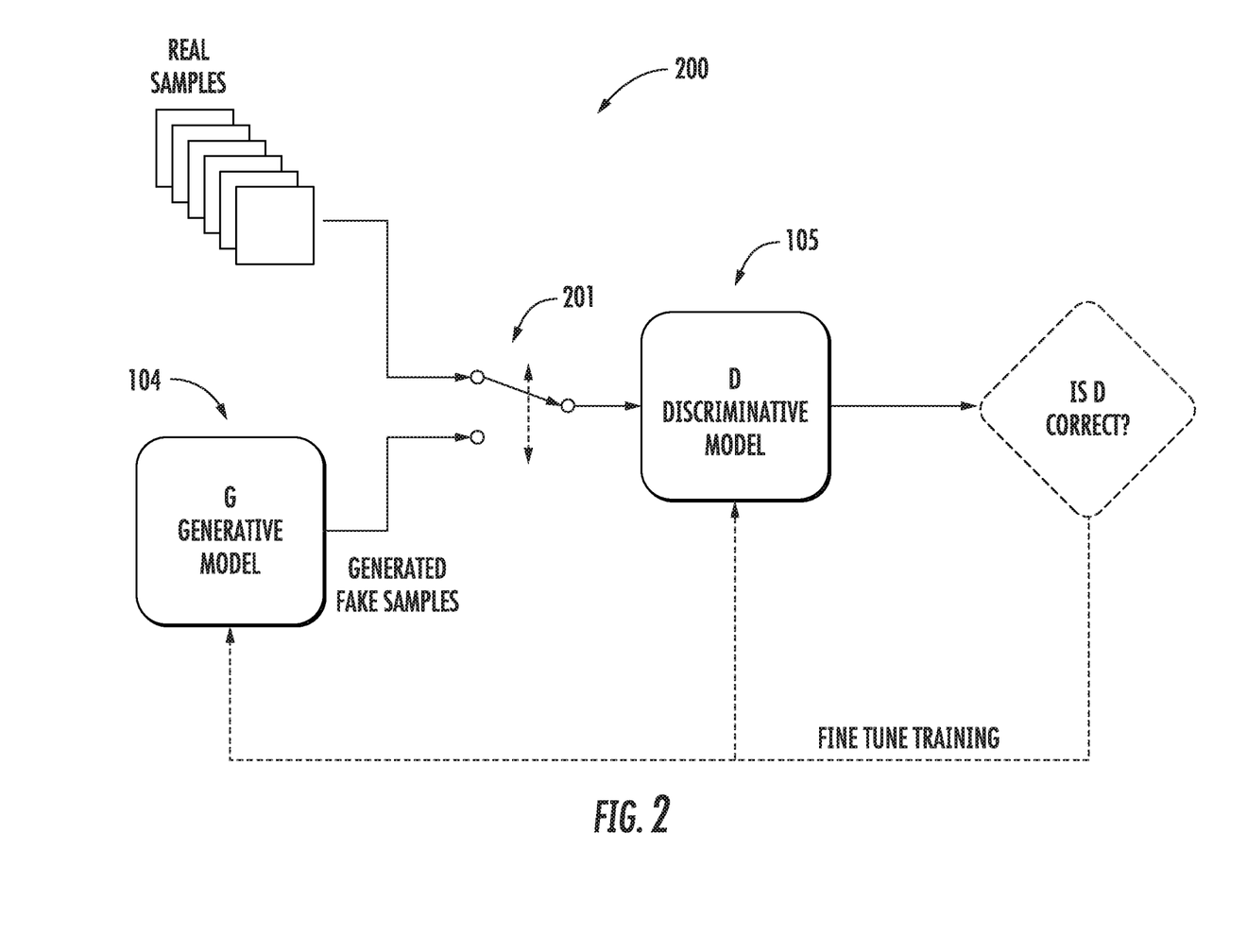
FIG. 2 illustrates a generative adversarial network (GAN), according to various example implementations.

FIG. 2 illustrates a GAN 200, according to various example implementations. The GAN may be built and trained by the machine learning module 103. At the beginning of the training process, the generative model 104 may not be able to generate simulated flight data that mimics the real flight data closely. Instead, at the beginning of the training process, the generative model may generate simulated flight data based on one or more random inputs from a known probability distribution such as a uniform distribution or a Gaussian distribution. The discriminative model 105 may alternatively receive a sample of real flight data from the data filter 102 and a sample of simulated or fake flight data from the generative model through a switching component 201. The real flight data may be generated from a data distribution of interest. In one example, the real flight data may include only flight data generated during as-designed operation. In another example, the real flight data may include only flight data generated during operation of the aircraft in a particular fault state such as a failure of a compressor. After receiving a sample, the discriminative model may determine whether the sample is a sample of real flight data or a sample of simulated flight data.

The generative model 104 and discriminative model 105 may have respective or separate loss functions that are simultaneously minimized during the training process by adapting weights or model parameters of the respective loss functions. In one example, the loss function for the generative model can be represented as:

$$L_G(z;\varphi) = -E_{fake} \log(D(G(z)))  \quad (1)$$

where z represents a random input to the generative model, $\varphi$ represents weights or model parameters of the generative model, $E_{fake}$ represents the expected value over simulated flight data from the generative model, D represents the decision of the discriminative model 105 such as fake flight data=1 and real flight data=0, and G(z) represents a sample produced by the generative model.

In one example, the loss function for the discriminative model 105 can be represented as:

$$L_D(x;\theta) = -\tfrac{1}{2} E_{real} \log(D(x)) - E_{fake} \log(1 - D(G(z)))  \quad (2)$$

where x represents a sample from the real data distribution (the data distribution of interest), $\theta$ represents weights or model parameters of the discriminative model, $E_{real}$ represents the expected value over real flight data from the real data distribution, D(x) represents the decision of the discriminative model such as fake flight data=1 and real flight data=0.

The discriminative model 105 can make a decision that whether a received sample is real flight data or simulated flight data. The system 100 may have the information or knowledge of whether the discriminative model actually receives a sample of real flight data or a sample of simulated or fake flight data. Thus, the system can determine whether the decision of the discriminative model is correct or not based on the information or knowledge. In one example, the discriminative model can make a decision that the received sample is real flight data, and this decision is correct, the weights or parameters of the discriminative model can be tuned or updated using gradient descent. If the decision is incorrect, the weights or parameters of the discriminative model can be updated with a different descent direction. In another example, the discriminative model can make a decision that the received sample is simulated flight data, and if this decision is correct, the weights or parameters of the generative model 104 can be updated using gradient descent. If the decision is incorrect, the weights or parameters of the generative model can be updated with a different descent direction.

As the training process progresses, the generative model 104 and discriminative model 105 can converge to an equilibrium such as Nash equilibrium. At the equilibrium, the generative model can generate simulated flight data having a corresponding distribution that matches a distribution of the real flight data. The discriminative model may have learned or captured salient statistical properties of the distribution of the real flight data. In one example, the generative model can generate simulated flight data having a corresponding distribution that matches a high-dimensional distribution of the real flight data. The generative model can generate samples of simulated flight data through G(z) using the input z to the generative model. The generative model can also generate samples from particular regions of the distribution generated by the generative model.

After the GAN 200 is trained, the machine learning module 103 can train an anomaly detector 106. Because the simulated data distribution produced by the generative model 104 may closely match the real data distribution, data storage requirements of the system 100 can be reduced. The system may store only a small amount of measured real flight data. The training of the anomaly detection model can be performed using the small amount of real flight data supplemented with a large amount of simulated flight data produced by the generative model and the learned features by the discriminative model. The quality of training the anomaly detector can be improved by using a large amount of training data including simulated flight data and the filtered real flight data.

The anomaly detector 106 may be required to operate on continuous variables. In one example, the discriminative model 105 may include the anomaly detector or can be used as the anomaly detector to detect faults states of an aircraft. In another example, the discriminative model and the anomaly detector can be separate models or filters. In this example, once the anomaly detector has been trained, it can be used in conjunction with the discriminative model to detect fault states of an aircraft and generate early warning signals of component failures.

Figure 3:
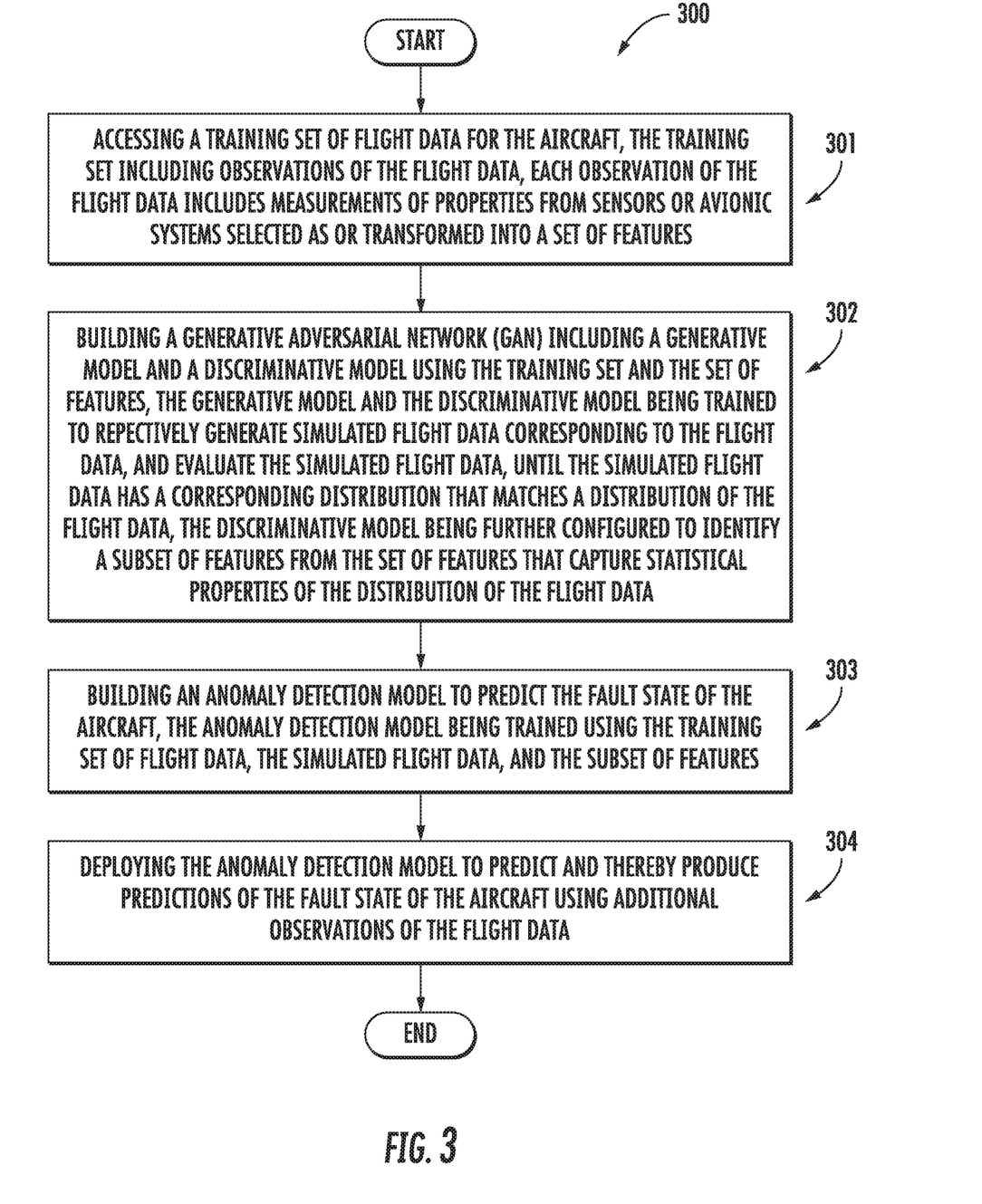
FIG. 3 is a flowchart illustrating various operations in a method of detecting a fault state of an aircraft, according to various example implementations.

FIG. 3 is a flowchart illustrating various operations in a method 300 of detecting a fault state of an aircraft 108, according to various example implementations. As shown at block 301, the method includes accessing a training set of flight data for the aircraft 108. The training set includes observations of the flight data. Each observation of the flight data includes measurements of properties from sensors or avionic systems selected and transformed into a set of features.

At block 302, the method includes building a GAN 200 including a generative model 104 and a discriminative model 105 using the training set and the set of features. The generative model and the discriminative model are trained to respectively generate simulated flight data corresponding to the flight data, and evaluate the simulated flight data. The generative model and the discriminative model are trained until the simulated flight data has a corresponding distribution that matches a distribution of the flight data. The discriminative model further identifies a subset of features from the set of features that capture statistical properties of the distribution of the flight data.

At block 303, the method 300 includes building an anomaly detection model 106 to predict the fault state of the aircraft 108. The anomaly detection model is trained using the training set of flight data, the simulated flight data, and the subset of features. At block 304, the method includes deploying the anomaly detection model to predict the fault state of the aircraft using additional observations of the flight data.

According to example implementations of the present disclosure, the system 100 and its subsystems including the data collector 101, data filter 102 and machine learning module 103 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
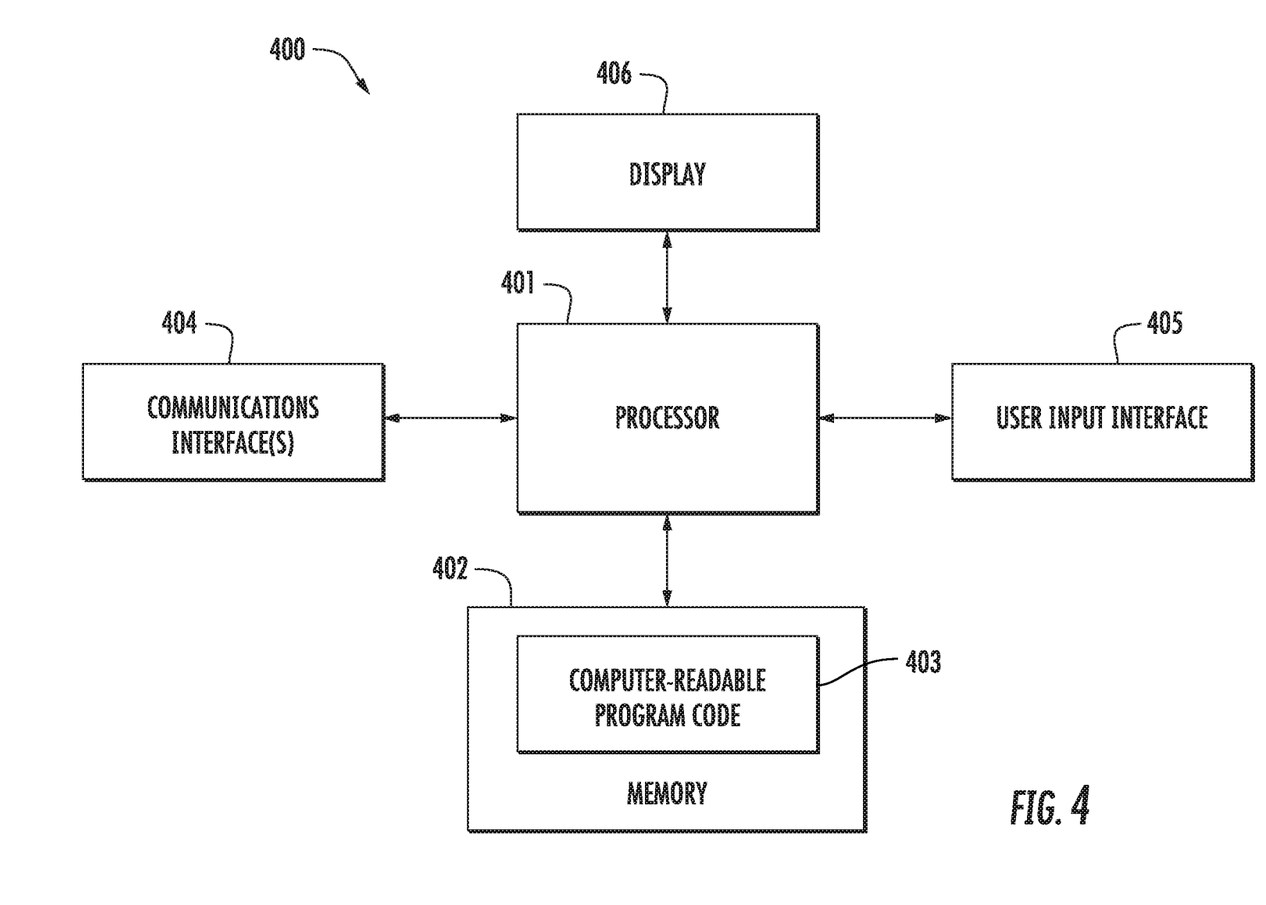
FIG. 4 illustrates an apparatus according to some example implementations.

FIG. 4 illustrates an apparatus 400 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 401 (e.g., processing circuitry) connected to a memory 402 (e.g., storage device). In some examples, the apparatus 400 implements the system 100.

The processor 401 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 402 (of the same or another apparatus).

The processor 401 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 402 is generally any piece of computer hardware that is capable of storing information such as, for example, data, computer programs (e.g., computer-readable program code 403) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 402, the processor 401 may also be connected to one or more interfaces for displaying, transmitting and/or receiving information. The interfaces may include a communications interface 404 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 406 and/or one or more user input interfaces 405 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 401 and a computer-readable storage medium or memory 402 coupled to the processor, where the processor is configured to execute computer-readable program code 403 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for detecting a fault state of an aircraft, the apparatus comprising a processor and a memory storing executable instructions that, in response to execution by the processor, cause the apparatus to at least:
   access a training set of flight data for the aircraft, the training set including observations of the flight data, each observation of the flight data includes measurements of properties from sensors or avionic systems selected and transformed into a set of features;
   build a generative adversarial network (GAN) including a generative model and a discriminative model using the training set and the set of features, the generative model and the discriminative model being trained to respectively generate simulated flight data corresponding to the flight data, and evaluate the simulated flight data, until the simulated flight data has a corresponding distribution that matches a distribution of the flight data, the discriminative model being further configured to identify a subset of features from the set of features that capture statistical properties of the distribution of the flight data;
   build an anomaly detection model to predict the fault state of the aircraft, the anomaly detection model being trained using the training set of flight data, the simulated flight data, and the subset of features; and
   deploy the anomaly detection model to predict the fault state of the aircraft using additional observations of the flight data.

2. The apparatus of claim 1, wherein the properties from the sensors or avionic systems are selected properties from a plurality of properties from a plurality of sensors or avionic systems, and the apparatus being caused to access the training set includes being caused to at least:
   access a flight dataset for the aircraft, the flight dataset including the observations of the flight data, each observation of the flight data includes measurements of the plurality of properties from the plurality of sensors or avionic systems; and
   filter the observations of the flight data by the selected properties to produce the training set including the observations of the flight data, each observation of flight data includes the measurements of the selected properties.

3. The apparatus of claim 1, wherein each observation is measured during operation of the aircraft in the fault state.

4. The apparatus of claim 1, wherein the discriminative model includes the anomaly detection model, and the apparatus being caused to build the anomaly detection model includes being caused to train the discriminative model to predict the fault state of the aircraft.

5. The apparatus of claim 1, wherein the generative model and the discriminative model are trained using Wasserstein distance to measure a difference between the distribution of the flight data and the corresponding distribution of the simulated flight data until the generative model and the discriminative model are in Nash equilibrium.

6. The apparatus of claim 1, wherein the memory stores further executable instructions that, in response to execution by the processor, cause the apparatus to further at least:
   establish a digital datalink with the aircraft;
   receive the additional observations of the flight data from the aircraft over the digital datalink;
   predict and thereby produce a prediction of the fault state of the aircraft using the anomaly detection model as deployed, and using the additional observations of the flight data received from the aircraft over the digital datalink; and
   generate an alert in response to the prediction.

7. The apparatus of claim 1, wherein the observations of the flight data in the training set of flight data are from a larger plurality of observations of the flight data, and the anomaly detection model is trained using the simulated flight data generated by the generative model, without using the larger plurality of observations of the flight data that are not retained in data storage of the apparatus to reduce a storage requirement of the apparatus.

8. A method of detecting a fault state of an aircraft, comprising:
   accessing a training set of flight data for the aircraft, the training set including observations of the flight data, each observation of the flight data includes measurements of properties from sensors or avionic systems selected and transformed into a set of features;
   building a generative adversarial network (GAN) including a generative model and a discriminative model using the training set and the set of features, the generative model and the discriminative model being trained to respectively generate simulated flight data corresponding to the flight data, and evaluate the simulated flight data, until the simulated flight data has a corresponding distribution that matches a distribution of the flight data, the discriminative model further identifying a subset of features from the set of features that capture statistical properties of the distribution of the flight data;
   building an anomaly detection model to predict the fault state of the aircraft, the anomaly detection model being trained using the training set of flight data, the simulated flight data, and the subset of features; and deploying the anomaly detection model to predict the fault state of the aircraft using additional observations of the flight data.

9. The method of claim 8, wherein the properties from the sensors or avionic systems are selected properties from a plurality of properties from a plurality of sensors or avionic systems, and accessing the training set includes at least:

accessing a flight dataset for the aircraft, the flight dataset including the observations of the flight data, each observation of the flight data includes measurements of the plurality of properties from the plurality of sensors or avionic systems; and filtering the observations of the flight data by the selected properties to produce the training set including the observations of the flight data, each observation of flight data includes the measurements of the selected properties.

10. The method of claim 8, wherein each observation is measured during operation of the aircraft in the fault state.

11. The method of claim 8, wherein the discriminative model includes the anomaly detection model, and building the anomaly detection model includes training the discriminative model to predict the fault state of the aircraft.

12. The method of claim 8, wherein the generative model and the discriminative model are trained using Wasserstein distance to measure a difference between the distribution of the flight data and the corresponding distribution of the simulated flight data until the generative model and the discriminative model are in Nash equilibrium.

13. The method of claim 8, further comprising:
establishing a digital datalink with the aircraft;
receiving the additional observations of the flight data from the aircraft over the digital datalink;
predicting and thereby produce a prediction of the fault state of the aircraft using the anomaly detection model as deployed, and using the additional observations of the flight data received from the aircraft over the digital datalink; and
generating an alert in response to the prediction.

14. The method of claim 8, wherein the observations of the flight data in the training set of flight data are from a larger plurality of observations of the flight data, and the anomaly detection model is trained using the simulated flight data generated by the generative model, without using the larger plurality of observations of the flight data that are not retained in data storage of an apparatus implementing the method to reduce a storage requirement of the apparatus.

15. A computer-readable storage medium for detecting a fault state of an aircraft, the computer-readable storage medium being non-transitory and having computer-readable program code stored therein that in response to execution by a processor, causes an apparatus to at least:

access a training set of flight data for the aircraft, the training set including observations of the flight data, each observation of the flight data includes measurements of properties from sensors or avionic systems selected and transformed into a set of features;

build a generative adversarial network (GAN) including a generative model and a discriminative model using the training set and the set of features, the generative model and the discriminative model being trained to respectively generate simulated flight data corresponding to the flight data, and evaluate the simulated flight data, until the simulated flight data has a corresponding distribution that matches a distribution of the flight data, the discriminative model being further configured to identify a subset of features from the set of features that capture statistical properties of the distribution of the flight data;

build an anomaly detection model to predict the fault state of the aircraft, the anomaly detection model being trained using the training set of flight data, the simulated flight data, and the subset of features; and deploy the anomaly detection model to predict the fault state of the aircraft using additional observations of the flight data.

16. The computer-readable storage medium of claim 15, wherein the properties from the sensors or avionic systems are selected properties from a plurality of properties from a plurality of sensors or avionic systems, and the apparatus being caused to access the training set includes being caused to at least:

access a flight dataset for the aircraft, the flight dataset including the observations of the flight data, each observation of the flight data includes measurements of the plurality of properties from the plurality of sensors or avionic systems; and filter the observations of the flight data by the selected properties to produce the training set including the observations of the flight data, each observation of flight data includes the measurements of the selected properties.

17. The computer-readable storage medium of claim 15, wherein the discriminative model includes the anomaly detection model, and the apparatus being caused to build the anomaly detection model includes being caused to train the discriminative model to predict the fault state of the aircraft.

18. The computer-readable storage medium of claim 15, wherein the generative model and the discriminative model are trained using Wasserstein distance to measure a difference between the distribution of the flight data and the corresponding distribution of the simulated flight data until the generative model and the discriminative model are in Nash equilibrium.

19. The computer-readable storage medium of claim 15, having further computer-readable program code stored therein that in response to execution by the processor, causes the apparatus to further at least:

establish a digital datalink with the aircraft;
receive the additional observations of the flight data from the aircraft over the digital datalink;
predict and thereby produce a prediction of the fault state of the aircraft using the anomaly detection model as deployed, and using the additional observations of the flight data received from the aircraft over the digital datalink; and
generate an alert in response to the prediction.

20. The computer-readable storage medium of claim 15, wherein the observations of the flight data in the training set of flight data are from a larger plurality of observations of the flight data, and the anomaly detection model is trained using the simulated flight data generated by the generative model, without using the larger plurality of observations of the flight data that are not retained in data storage of the apparatus to reduce a storage requirement of the apparatus.

* * * * *